United States Patent Office 2,830,956
Patented Apr. 15, 1958

2,830,956

HYDRAULIC POWER TRANSMISSION FLUIDS

Jones I. Wasson, Union, Douglas L. Bonham, Cranford, and William C. Howell, Jr., Union, N. J., assignors to Esso Research and Engineering Company, a corporation of Delaware No Drawing. Application February 12, 1954
Serial No. 410,032

1 Claim. (Cl. 252—76)

The present invention relates to hydraulic power transmission fluids, and particularly to oil compositions designed for use in fluid couplings, automatic transmissions of both the gear type and torque converter type, and semi-automatic transmissions, which require a liquid hydraulic medium. Such mechanisms are being used to an increasing degree in the automotive industry, and the composition of the present invention is particularly adapted for these and analogous purposes.

This application is a continuation-in-part of Serial No. 192,616, filed October 27, 1950, now abandoned, and assigned to the same assignee.

As indicated in an application, Serial No. 182,138, filed August 29, 1950, now Patent No. 2,683,120, by Jennings, Schlaer and Howell (one of the present inventors), the efficient operation of fluid type transmissions and drives of the character mentioned above requires special properties in the fluid. A suitable fluid, generally speaking, must be a good lubricant and, in addition, must have the following special properties:

(1) Relatively low viscosity, to avoid objectionable drag or power consumption when power is not being transmitted; also to permit satisfactory flow through restricted passages for special types or phases of operation. In general, the viscosity of the fluid should be in the range from about 34 to about 60 SSU at 210° F. For general passenger vehicle use, a viscosity range of 50 to 60 SSU at 210° F. is needed, preferably 50 to 56 SSU. For certain types of passenger vehicle transmissions, such as torque converters which do not involve gear shifting operations, a lower viscosity fluid is also satisfactory. The minimum viscosity for satisfactory operation of such transmissions is limited by the need for maintaining adequate pump pressure in the hydraulic systems, and has been found to be approximately 36 SSU at the maximum operating temperature likely to be encountered under very severe operating conditions, viz., about 300° F. This, in effect, sets a limit of about 44 SSU at 210° F. minimum for the fluid, depending upon its viscosity index. For large heavy duty torque converter transmissions, such as are used in busses and industrial equipment, the pressurizing pump design characteristics are such that even lower viscosity fluids are sometimes permissible, fluids of 34 to 36 SSU at 210° F. having been found to be most satisfactory for transmissions of this type.

(2) As uniform a viscosity as practicable over a wide temperature range to give uniform operation quite independently of ambient or operating temperatures. For passenger car transmissions, a high viscosity index is requisite, preferably 130 or higher, 150 or more being desirable for the best operation of some widely used units. This commonly requires the addition of a stable and effective viscosity index improver of high potency.

(3) A high degree of stability against mechanical breakdown or chemical deterioration. The components of a good hydraulic transmission oil should not break down on being subjected to severe mechanical shear. The fluid must have good resistance to oxidation and should be inhibited, if necessary, against corrosivity toward metals, sludge and gum formation, and the like. It should also dissolve or suspend the sludges, gums and foreign matter which otherwise might accumulate and interfere with efficient operation. Hence it should contain a detergent and/or an antioxidant.

(4) The product must be an efficient lubricant, in the sense that it reduces the friction between relatively moving mechanical elements to a practical minimum. This requires, ordinarily, the addition of a superior lubricity or "oiliness" agent, ordinary mineral base oils being somewhat deficient in this respect.

(5) For safety, the oil must have a reasonably high flash point. The flash point should not be less than 300° F.; 310° F. is a preferred minimum, and a minimum of 350° F. is desirable where it can be attained consistently with the other requirements. The more volatile fluids may evaporate to an objectionable degree, especially when operating temperatures reach 200° F. or more, as frequently happens.

(6) A low freezing or pour point is essential, especially for winter operation. Since automotive transmission fluids, e. g., are not changed as frequently as crankcase lubricants, they should always be suitable for operation at the lowest operating temperatures to be expected during the year. A pour point at least as low as —20° F. is usually required and it is preferably no higher than —35° F.

(7) While all the separate characteristics mentioned above are met in various degrees in prior art lubricants, and the like, and have been combined in various ways, the rather exacting requirements of commercial fluid transmissions demand that the separate qualities be added without derogation to each other. Thus, the oiliness agent must not unduly raise the pour point; lower the viscosity index or form a sludge. The viscosity index improver must be able to withstand severe mechanical shear without structural breakdown or loss of potency. The detergent must be capable of dissolving or keeping in suspension all sludge and foreign matter that might be formed or accumulated otherwise, without adding to corrosivity or interfering substantially with the other properties, and so on. The degree to which a lubricant must have each of the above special properties varies somewhat with the mechanism and the service but for all around service all of the properties are important.

According to the present invention, the first requirement is met largely by the selection of the base oil. It is preferred to use a highly refined paraffinic (Mid-Continent) oil, especially a solvent extracted oil having a viscosity of about 35 to 37 SSU at 210° F. and a viscosity index of at least 100. It should have a flash point in excess of 300° F., preferably 330° F. or higher. One very satisfactory oil has a viscosity index (without additives) of about 107.

The second requirement is met preferably by the choice of a polymeric viscosity index improver which has excellent resistance to breakdown under severe mechanical shear. It should have a flash point about as high as, and preferably somewhat higher than, that of the base oil. Polybutene of medium and fairly uniform molecular weight (fairly free from high molecular weight components) may be used, or broken down butyl rubber of the same properties. The so-called "Acryloid" polymers which are methacrylate polymers also may be used, provided they meet requirements for high shear stability.

It is desirable, though not always essential, to incorporate a small amount of a potent antioxidant, such as a ditertiary alkyl phenol or cresol, e. g., ditertiary butyl paracresol. A detergent such as alkaline earth metal sulfonate or salt of dialkyl phenol sulfides, or both, should be added to prevent sludging and gum deposits.

To keep the pour point low, a mechanically and chemically stable pour point depressant, such as an ester copolymer, is preferred for compatibility with the other ingredients. A copolymer, for example, of vinyl acetate with the long chain alcohol esters of fumaric, itaconic or maleic acid (or anhydride) is very satisfactory. A minor proportion of an extracted Coastal oil of 35 to 46 S. S. U. at 210° F. viscosity may also be blended into the paraffinic oil to depress the pour point a little further where a low pour point is more important than high viscosity index.

The proper choice of an oiliness agent is particularly critical where the fluid is to be used with certain types of automatic transmissions involving fluid couplings and automatically operated clutches, e. g., friction clutches operated by solenoids or by hydraulic mechanisms. If the lubricant does not have sufficient oiliness, the clutch operation tends to be rough and erratic, causing objectionable wear and noisy operation. On the other hand, if the power transmission fluid has too much oiliness, the clutch unit tends to slip unduly, resulting in poor operating characteristics and leading eventually to undue wear. Transmission fluids which permit an audible "squawking" in transmission of the automatic type are not acceptable. At the same time, the oiliness agent must be compatible with other ingredients and essential properties. The major object of the present invention is to obtain the desired oiliness properties required to eliminate "squawking" without introducing objectionable characteristics into the oil composition.

Numerous oiliness agents of various degrees of activity are known to the prior art. It is well known, for example, that various of the common fatty acids, fatty oils and esters and their chlorinated derivatives have good oiliness characteristics. This is true, also, of certain non-aliphatic materials such as tricresyl phosphate and related esters. None of these materials when used alone completely eliminates "squawking" in a manner acceptable to the trade.

According to the present invention, however, it has been found that the oil-soluble free fatty acids, either saturated or unsaturated, having between about 14 and 22 carbon atoms, when used in proportions of 0.1–1% by weight of the total composition, together with sulfurized or unsulfurized fatty oils, such as sperm oil, lard oil, whale oil, neat's-foot oil, olive oil, palm oil, etc. used in proportions of about 1–5% by weight, are particularly suitable for this purpose, sperm oil being preferred. Within these limits, the two oiliness agents should be so proportioned that a total of about 1.5–6% by weight of fatty acid and fatty oil is present in the oil. Slightly more fatty acid is required when a sulfurized rather than a non-sulfurized fatty oil is used, the minimum amount of fatty acid needed in combination with sulfurized fatty oil being 0.25% by weight as compared with a minimum requirement of 0.1% by weight of fatty acid in combination with non-sulfurized fatty oil. Preferred combinations are 0.25–0.5% by weight of fatty acid with 2–4% by weight of sulfurized fatty oil or 0.1–0.4% by weight of fatty acid with 2–4% by weight of unsulfurized fatty oil. Both the use of these two oiliness agents in combination and the specific proportions and ratios have been found critical for the purposes of the invention. This combination of oiliness agents is superior to the animal and vegetable oils and the other esters, such as tricresyl phosphate, which have frequently been used in the prior art as oiliness agents.

The free acids mentioned above, such as oleic acid, stearic acid, erucic acid and their immediate analogs and homologs are objectionably corrosive to certain types of metals. Even in proportions of as little as 0.1 to 0.5%, these acids are found frequently to cause corrosion of lead alloy bearings. This drawback may be overcome by the addition of conventional corrosion inhibitors. It has also been found, according to the present invention, that metal corrosion inhibitors which are not particularly effective with some types of oiliness agents are quite satisfactory to prevent the objectionable corrosion of the fatty acids. In particular, a small quantity, between 0.01 and 1.0%, of a sulfurized olefinic hydrocarbon appears to be a satisfactory corrosion inhibitor in combination with the fatty acid oiliness agents. Examples are sulfurized dipentene and the homologous and closely analogous sulfurized terpenes, especially monocyclic terpenes. These perform very satisfactorily to inhibit corrosion without interference with the desired oiliness characteristics.

A specific embodiment of the present invention, therefore, resides in the discovery that a particular combination of about 0.1 to 1.0% of the $C_{14}$ to $C_{22}$ oil-soluble fatty acids, especially erucic acid and oleic acid, i. e. the $C_{22}$ and $C_{18}$ mono-unsaturated fatty acids, which appear first and second choice, with 1–5% by weight of sulfurized or unsulfurized fatty oil, totaling about 1.5 to 6% by weight and 0.01 to 1.0% by sulfurized olefinic hydrocarbons, especially the rather highly sulfurized terpenes, is a highly satisfactory modifier for transmission fluids.

In addition to the oiliness agents which characterize the most important aspect of the present invention, the hydraulic transmission fluid of the type under consideration preferably has other features improving its utility. A preferred composition contains as the lubricating oil base a hydrocarbon (preferably mineral base) lubricating oil of appropriate viscosity, generally between 35 and 60 S. S. U. viscosity at 210° F., which is used in amounts of about 75–85% by weight, preferably about 77–82% by weight of the total composition. The specific viscosity may vary somewhat with the particular mechanism. The "Hydra-Matic" transmissions seem to operate best with a fluid of 54–56 S. S. U. at 210° F., whereas some of the torque converter types may operate with less viscous products, down to about 35 S. S. U.

Load-carrying and film-strengthening characteristics may be incorporated by the use of sulfurized fatty oils, such as sulfurized sperm oil or lard oil or their equivalent. Low temperature properties may be improved by the substitution of unsulfurized sperm oil or other fatty oil for part of the sulfurized material.

Preferably, also, the product contains an effective detergent. Most conventional detergents for lubricating oils are useful for this purpose. Specific examples are alkaline earth metal salts of alkyl phenol sulfides and/or an alkali or alkaline earth metal sulfonate of high molecular weight and good oil-solubility. A combination of oil-soluble calcium sulfonate of high molecular weight and high alkalinity, with alkaline barium salt of dialkyl phenol sulfide, is particularly suitable for this service.

For good operation under a wide range of temperature, the overall composition should have a high viscosity index, at least 130 or 135 and preferably 150 or higher. This requires the addition of an effective viscosity index improver of which several types are available on the market. Preferred types have been mentioned above, especially the ester copolymers and the acrylate or methacrylate polymers.

EXAMPLE A

Several different oils of suitable viscosity for an automatic fluid operated clutch and shift type transmission unit ("Hydra-Matic") and containing varying proportions of sulfurized and unsulfurized sperm oil were tested with and without the addition of fatty acid to determine whether there is a correlation between the coefficient of friction and satisfactory functioning without "squawking." The coefficients of friction were measured in a special test apparatus in which a steel disc was rubbed against an insert of the friction surface material used in standard "Hydra-Matic" clutches. It was found that fluids having coefficients of friction below about 0.128 under a load of 15 kilograms, and below about 0.116 under a load of 20 kilograms, would not "squawk" in "Hydra-Matic" transmission service. The effect of adding a small amount of oleic acid, or other oiliness agents of related type, is shown clearly in the following table. All the oils were of essentially the same type, of about 55 SSU viscosity at 210° F.

*Table I*

| Composition [1] | Coefficient of friction | | Squawk in "Hydra-Matic" test |
|---|---|---|---|
| | 15 kg. | 20 kg. | |
| Oil A | 0.167 | 0.160 | Yes. |
| Oil A +1% oleic acid | 0.119 | 0.109 | No. |
| Oil B | 0.148 | 0.148 | Yes. |
| Oil B +0.1% oleic acid | 0.128 | 0.116 | No. |
| Oil C | 0.149 | 0.145 | Yes. |
| Oil C +0.25% oleic acid | 0.123 | 0.107 | No. |
| Oil D | 0.140 | 0.132 | Yes. |
| Oil D +0.1% stearic acid | 0.119 | 0.116 | |
| Oil E | 0.136 | 0.126 | |
| Oil E +0.1% stearic acid | | | Borderline. |
| Oil E +0.2% stearic acid | | | No. |

[1] See the following table:

| | Solvent-extracted mineral oil of 35-40 SSU at 210 | V. I. improver | Sulfurized sperm oil, weight percent | Sperm oil | Pour point depressor | Detergent and antioxidant |
|---|---|---|---|---|---|---|
| Oil A | 81.5 | 12.0 | 1.0 | | 0.7 | 4.8 |
| Oil B | 80.3 | 11.2 | | 3.0 | 0.7 | 4.8 |
| Oil C | 80.3 | 11.2 | 3.0 | | 0.7 | 4.8 |
| Oil D | 82.0 | 12.0 | 1.0 | | 0.7 | 4.3 |
| Oil E | 79.2 | 12.3 | 3.0 | | 0.7 | 4.8 |

EXAMPLE B

Erucic acid was found to be a particularly potent additive for reducing the coefficient of friction. It is effective, also, for reducing wear. Of course, the reduction of friction must not be too great or the clutch will soon become inoperative or will operate unsatisfactorily. A standard high grade S. A. E. 20 motor oil was used as the base oil and was tested for coefficient of friction in the standard 4-ball wear testing machine manufactured by the Precision Scientific Company. This test is conducted by rotating one ½" steel ball, under 10 kg. load, against a "bearing" formed of three similar steel balls which are locked against rotation. The rotating ball is driven at 600 R. P. M. for one hour under a controlled temperature of 167° F. in the continuous presence of lubricant. Wear is determined by measuring the diameter of scar on the non-rotating balls. Proportions of acid, in all cases, are by weight, based on total composition.

*Table II*

| Oil | Steel on steel coefficient of friction | | Diameter of wear scar, mm. |
|---|---|---|---|
| | 10 kg. load | 20 kg. | |
| S. A. E. 20 grade | 0.097 | 0.098 | 0.57 |
| S. A. E. 20 grade +0.1% erucic acid | 0.097 | 0.095 | 0.32 |
| S. A. E. 20 grade +0.5% erucic acid | 0.090 | 0.084 | 0.24 |
| S. A. E. 20 grade +1.0% erucic acid | 0.085 | 0.085 | 0.22 |
| S. A. E. 20 grade +0.5% oleic acid | 0.085 | 0.086 | 0.47 |
| S. A. E. 20 grade +0.5% stearic acid | 0.097 | 0.087 | 0.48 |
| S. A. E. 20 grade +0.5% behenic acid | 0.091 | 0.089 | 0.54 |
| S. A. E. 20 grade +0.5% caprylic acid | 0.094 | 0.095 | 0.52 |

It will be noted, from the data in Table II, that all of the acids were somewhat effective in reducing the coefficient of friction, that oleic acid and erucic acid were most potent in this respect and about equally effective. The erucic acid, however, was markedly superior to the other acids, in reduction of wear, as measured by the 4-ball wear test. The combination of friction reducing and wear reducing effectiveness is particularly desirable in oils for fluid power transmissions.

However, for transmissions involving sliding gears, where good oiliness and high film strength are particularly important, it is essential that the fluids contain some fatty oil, preferably sulfurized, such as sperm oil or lard oil. This is indicated in the next example.

EXAMPLE C

A composition was prepared consisting basically of a highly refined mineral oil of about 55 SSU viscosity at 210° F. with a sufficient quantity of a stable polymeric viscosity index improver of moderate molecular weight to bring the total composition up to about 150 viscosity index. Specifically, this product contained 3% by weight, based on the total composition, of sulfurized sperm oil and 0.25% oleic acid as combined oiliness and load-carrying agents. 5% by weight of an oil solution containing barium di-isobutyl phenol sulfide and calcium sulfonate of sulfonic acids having a molecular weight above 500 were added for detergency. This product was tested in a "Hydra-Matic" transmission unit of the type used in several automobiles manufactured by General Motors and was found to eliminate an objectionable "squawk" which several commercial hydraulic oils failed to eliminate. The product, however, was somewhat corrosive, showing bearing weight losses of about 0.30 to 0.34 gram per bearing in the standard 36 hour L-4 Chevrolet engine tests, operating at an oil temperature of 265° F. This test is standard for motor oils to determine bearing corrosion and oxidation stability. Transmission oils should pass motor oil standards.

EXAMPLE D

The product of Example C was modified by adding thereto 0.2% of sulfurized commercial "dipentene" having a sulfur content of between 25 and 30% by weight. The "dipentene" was a mixture of isomeric and homologous terpenes, predominantly dipentene. This product passed the "squawking" test satisfactorily and its corrosivity to the alloy bearing metals was markedly reduced. In the standard 36 hour L-4 Chevrolet engine test, bearing weight loss was reduced from .30 to .34 gram per bearing down to 0.07 gram. The piston varnish demerit rating was reduced from an objectionably high value of 2.3 to the very satisfactory level of 0.2. Since some automobile manufacturers have required that hydraulic transmission fluids pass engine tests as regards corrosivity and varnish, these tests are significant.

As indicated above, stearic acid or behenic acid, or preferably erucic acid, may be substituted for oleic acid with substantially the same results. Of the fatty oils, the relatively insoluble oils, such as castor oil, are not recommended because they tend to separate and form sludge. If it is desired to use such an oil, however, this tendency may be overcome to some degree by increasing the quantity of detergent or by using a mutual solvent. Commercial surface active agents such as sorbitan mono-oleate or other available partial esters of polyhydroxy alcohols, and the like, may be used as additional modifying agents. Some of these are sold by the Atlas Powder Co. under the trade names "Spans," "Tweens,"

etc. As indicated above, the fatty acids employed to reduce friction should be combined with a suitable metal corrosion inhibitor, such as sulfurized olefinic hydrocarbons, preferably in proportions of .01 to 1.0%, based on the weight of the total composition. As also indicated above, the preferred corrosion inhibitors are the sulfurized terpenes and especially sulfurized dipentene which has been treated to remove objectionable free sulfur and which has a sulfur content of between about 20 and 30%.

As previously indicated, it is important to add sulfurized or unsulfurized fatty oils, particularly sulfurized sperm oil or sulfurized lard oil, as an oiliness and film strengthening component. These materials, per se, have an adverse effect on the pour point of waxy oils, especially when used in concentrations greater than 1%. Another aspect of the present invention is the discovery that the substitution of the corresponding unsulfurized oil, e. g., lard oil or sperm oil, accomplishes two things. It gives a lower pour point and the "anti-squawk" properties also are improved. Where load-carrying properties are not too important, the entire quantity of sulfurized oil may be replaced by the corresponding unsulfurized product. Otherwise, it may be desirable to replace part of the sulfurized material with unsulfurized fatty oil. A combination of sulfurized and unsulfurized fatty oil with a small amount of free fatty acid, as previously described, makes a very satisfactory product.

The following data illustrates the effect of substituting the fatty oil for part of the sulfurized product. The fluids employed were of mineral base with overall viscosities of about 55 SSU at 210° F. and viscosity indexes raised to about 150 with polymeric viscosity index improvers (polybutene of medium molecular weight, relatively free of high molecular weight products which tend to break down on severe shear).

EXAMPLE $E_1$

A transmission fluid was prepared of the following composition:

| | Weight percent |
|---|---|
| Blend of solvent extracted neutral (Mid-Continent) oils of about 36 and 43 SSU at 210° F | 85.9 |
| Detergent (barium salt of diisobutyl phenol sulfide) | 2.0 |
| Anti-oxidant (ditertiary butyl cresol) | 0.4 |
| Pour depressant (copolymer of vinyl acetate and maleic ester) | 0.7 |
| Viscosity index improver (20% solution of polybutene in SAE 20 oil) | 10.0 |
| Sulfurized sperm oil | 1.0 |

This product had a pour point of only −10° F. When 1% of 45° natural winter sperm oil was added, the pour point dropped to −20° F. An increase of the natural (unsulfurized) sperm oil to 3% did not further improve the pour point.

Further experiments were carried out, omitting the detergent and anti-oxidant.

When a superior polybutene type viscosity index improver, a polymer of more uniform molecular weight, was substituted for the V. I. improver of Example $E_1$, the pour point was not affected appreciably. Substitution of a solvent extracted Coastal oil for the 43 SSU component of the oil in Example $E_1$ resulted in some improvement. With 1% of sulfurized sperm oil as the only oiliness agent, the pour point was −20° F. When 1% of natural sperm oil was substituted, the pour point dropped to −25° F. In both of the latter cases, the product had better pour point stability, as determined by the S. O. D. cycle A test, when the natural sperm oil replaced the sulfurized oil. The composition became solid at −20° F. with sulfurized oil but remained liquid with natural sperm oil.

EXAMPLE $E_2$

| | Weight percent |
|---|---|
| Solvent extracted Mid-Continent neutral oil, 36 SSU vis. at 210° F | 60.0 |
| Similar Coastal oil, 43 SSU at 210° F | 19.1 |
| Viscosity index improver (20% blend in SAE 20 oil of polybutene of narrow medium molecular weight range) | 10.7 |
| Polymethacrylate viscosity index improver | 1.6 |
| Detergent (combination of barium salt of dialkyl phenol sulfide and calcium sulfonate of high molecular weight) | 4.4 |
| Anti-oxidant as in Example $E_1$ | 0.4 |
| Pour depressant as in Example $E_1$ | 0.7 |
| Sulfurized sperm oil | 3.0 |
| Stearic acid (commercial grade) | 0.1 |
| Anti-foamant | Trace |

In this example, the pour point was −35° F. with the sulfurized sperm oil and −55° F. with 3% of unsulfurized sperm oil. Since the sulfurized sperm oil is a desirable ingredient when unit pressures (e. g., between gear teeth) are very high, it is apparent that a compromise, substituting only a part of the unsulfurized for the sulfurized fatty oil would give a very good product, of adequately low pour point, without losing the advantage of the sulfurized load-carrying and field strengthening ingredient. The sulfurized sperm oil of Example $E_2$ had a sulfur content of 6% by weight.

EXAMPLE $E_3$

In this example, the formula of Example $E_2$ was repeated, except that 0.1% of oleic acid was substituted for the stearic acid and the polymethacrylate type additive was omitted. As previously noted, the oleic acid had superior oiliness or friction reducing properties. The pour point was as good as that of Example $E_2$, without the polymethacrylate component. With 3% of sulfurized sperm oil (sulfur content 12% in this case) a "Hydra-Matic" transmission unit was found to "squawk" quite audibly, indicating unsatisfactory clutching operation. This ceased when 3% of 45° natural winter sperm oil was substituted. Pour points were −35° and −55° F., respectively, for the sulfurized and unsulfurized products.

Experiments $E_1$, $E_2$ and $E_3$ clearly indicate the desirability of substituting natural or unsulfurized fatty oil for at least a part of the sulfurized product to improve the pour point and to insure smooth operation of automatic clutch type transmissions. The extent to which such substitution can be made depends upon the film strength or extreme pressure properties which are required. For average service, it is desirable to retain some sulfurized fatty oil in the composition.

A very large number of additional experiments have been conducted and, in general, they confirm the discoveries which constitute the basis of the present invention. In general, they show the following:

(1) When using only 1% of sulfurized sperm or lard oil, relatively large quantities of a potent friction reducing fatty acid agent, preferably oleic or erucic acid is required. 0.25% of oleic acid is insufficient. Compare test samples 1, 2 and 3 of Table III. Proportions of fatty acid should be closer to 1% as shown by test sample 25. Larger quantities of unsulfurized fatty oils, such as natural sperm oil, are recommended, although they are highly potent oiliness agents, because less fatty acid may be used in this case. This is illustrated by test samples 26 and 27 which show the beneficial effect of as little as 0.1% of fatty acid in combination with high concentrations of unsulfurized fatty oil.

(2) With as much as 3% sulfurized fatty oil, 0.25% of an effective fatty acid, such as oleic or erucic acid, is adequate to prevent squawking of "Hydra-Matic" units. Compare test samples 4, 5, 7, 8, 9, 23, 24 of Table III.

(3) Other well known and normally effective oiliness agents, such as isopropyl oleate and various other esters, are not satisfactory at all. See test samples 20 to 22.

(4) Improvements in high temperature oxidation stability and reduction in corrosivity are very appreciable with sulfurized dipentene and equivalent anti-oxidants but these do not eliminate need for the fatty acids and fatty oils as anti-squawk additives. Compare test samples 9, 10, 11, 12, 13, 15, 17, 18 of Table III.

The data just described are summarized in Table III below:

ference between a satisfactory and an unsatisfactory fluid as regards "squawing" in the "Hydra-Matic" unit. This constitutes the basic feature of the invention. The quantities of fatty acid can be very small when proportions of fatty oil are large, but they are essential. A material supplying fatty acid, which has the same net effect upon the coefficient of friction may be substituted for the fatty acid proper.

Oxidation or corrosion inhibitors such as sulfurized dipentene or other sulfur or phosphorus sulfide-treated terpenes are preferably used with the fatty acids but these

*Table III*

| Sample number | 1 | 2 | 3 | 4 | 5 | 6 | 7 | 8 | 9 | 10 | 11 | 12 | 13 |
|---|---|---|---|---|---|---|---|---|---|---|---|---|---|
| Composition, weight percent: | | | | | | | | | | | | | |
| Solvent extracted Mid-Continent oil of 36 SSU vis. at 210° F | 56.3 | 55.6 | 56.1 | 56.6 | 56.3 | 60.0 | 59.9 | 59.8 | 59.8 | 59.3 | 59.45 | 59.0 | 58.8 |
| Solvent extracted Coastal oil, 40 SSU at 210° F | 25.2 | 25.0 | 25.1 | 23.7 | 23.7 | 19.2 | 19.2 | 19.2 | 19.1 | 18.9 | 19.0 | 18.8 | 18.7 |
| V. I. improver, (polybutene[a]) | 12.0 | 11.9 | 12.0 | 11.2 | 11.2 | 10.7 | 10.7 | 10.7 | 10.7 | 10.6 | 10.7 | 10.6 | 10.6 |
| V. I. improver, (polymethacrylate) | | | | | | 1.6 | 1.6 | 1.6 | 1.6 | 1.8 | 1.6 | 1.6 | 1.6 |
| Sulfurnized sperm oil[b] | 1.0 | 1.0 | 1.0 | 3.0 | 3.0 | 3.0 | 3.0 | 3.0 | 3.0 | 3.0 | 3.0 | 4.0 | 4.0 |
| Detergent A[c] | 4.4 | 4.4 | 4.4 | 4.4 | 4.4 | 4.4 | 4.4 | 4.4 | 4.4 | 5.0 | 4.4 | 4.4 | 4.4 |
| Antioxidant[d] | 0.4 | 0.4 | 0.4 | 0.4 | 0.4 | 0.4 | 0.4 | 0.4 | 0.4 | 0.4 | 0.4 | 0.4 | 0.4 |
| Pour depressant[e] | 0.7 | 0.7 | 0.7 | 0.7 | 0.7 | 0.7 | 0.7 | 0.7 | 0.7 | 0.7 | 0.7 | 0.7 | 0.7 |
| Oleic acid | | 1.0 | 0.25 | | 0.25 | | 0.1 | 0.2 | 0.25 | 0.25 | | | 0.25 |
| Other agents[f] | | | | | | | | | | | 0.5 | 0.5 | 0.5 |
| Visc., SSU, at 100° F | 234.8 | 206.0 | 207.5 | 209.7 | 207.9 | 205.5 | 212.5 | | 205.2 | 212.2 | 212.6 | 209.4 | 208.1 |
| Visc., SSU, at 210° F | 58.7 | 54.5 | 54.7 | 55.2 | 54.6 | 54.5 | 55.2 | | 54.6 | 55.0 | 55.0 | 54.9 | 54.7 |
| Viscosity index | 151.3 | 150.6 | 150.5 | 150.5 | 150.2 | 150.8 | 150.0 | | 152.0 | 150.0 | 149.6 | 150.3 | 150.3 |
| Flash point, ° F | 370 | 370 | 360 | 365 | 380 | 370 | 370 | | 355 | 365 | 385 | 370 | 370 |
| ASTM pour point, ° F | −30 | −40 | −35 | −30 | −30 | −40 | −35 | | −35 | −40 | −45 | −35 | −35 |
| Squawk test: | | | | | | | | | | | | | |
| Condition of parts | New | Used | New | Used | Used | Used | New | Used | New | Used | Used | Used | Used |
| Squawk at low temp | Yes | No | Yes | Yes | No | Yes | Yes | Yes | No | No | No | No | No |
| Squawk at high temp | | No | No | No | No | No | Yes | Yes | No | No | No | Yes | No |
| 36-hour Chevrolet Engine test: | | | | | | | | | | | | | |
| (Varnish demerit) | | | | | | | | | 2.75 | 2.33 | 3.6 | | |
| Copper-lead bearing weight loss, grams | | | | | | | | | 0.335 | 0.303 | 0.09 | | |

| Sample number | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Composition, weight percent: | | | | | | | | | | | | | | |
| Solvent extracted Mid-Continent oil of 36 SSU vis. at 210° F | 58.6 | 62.9 | 12.7 | 59.15 | 57.9 | 56.3 | 58.0 | 59.3 | 58.6 | 59.9 | 59.8 | 55.6 | 56.6 | 56.6 |
| Solvent extracted Coastal oil, 40 SSU at 210° F | 18.8 | 20.0 | [g]72.0 | 18.9 | 18.6 | 25.2 | 18.5 | 18.0 | 17.8 | 19.2 | 19.1 | 25.0 | 23.7 | 23.7 |
| V. I. improver (polybutene[a]) | 10.6 | 8.2 | 7.6 | 10.6 | 10.4 | 12.0 | 10.6 | 10.7 | 10.6 | 10.7 | 10.7 | 11.9 | 11.2 | 11.2 |
| V. I. improver, (polymethacrylate) | 1.8 | 1.5 | | 1.8 | 1.8 | | 1.8 | 1.8 | 1.8 | 1.6 | 1.6 | | | |
| Sulfurized sperm oil[b] | 4.0 | 3.0 | 3.0 | 3.0 | 3.0 | 1.0 | 3.0 | 3.0 | 3.0 | 3.0 | 3.0 | 1.0 | [h]3.0 | [h]3.0 |
| Detergent A[c] | 5.0 | 3.4 | 3.5 | 5.0 | 4.4 | 4.4 | 5.0 | 5.0 | 5.0 | 4.4 | 4.4 | 4.4 | 4.4 | 4.4 |
| Antioxidant[d] | 0.4 | | | 0.4 | 0.4 | 0.4 | 0.4 | 0.4 | 0.4 | 0.4 | 0.4 | | | 0.4 |
| Pour depressant[e] | 0.7 | 0.5 | 0.7 | 0.7 | 0.7 | 0.7 | 0.7 | 0.8 | 0.8 | 0.7 | 0.7 | 0.7 | 0.7 | 0.7 |
| Oleic acid | 0.1 | 0.25 | 0.25 | 0.25 | 0.25 | | | | | | | 1.0 | | 0.1 |
| Other agents[f] | | 0.2 | 0.2 | 0.2 | 2.0 | | 2.0 | 1.0 | 2.0 | 0.1 | 0.25 | | | |
| Visc., SSU, at 100° F | | 165.4 | 192.8 | | | 211.0 | 206.2 | 219.0 | | 211.2 | 212.5 | 206.6 | 193.4 | |
| Visc., SSU, at 210° F | | 49.6 | 49.9 | | | 55.2 | 54.8 | 56.1 | | 55.0 | 55.2 | 54.5 | 53.1 | |
| Viscosity index | | 153.0 | 137 | | | 150.5 | 151.0 | 150.0 | | 150.0 | 150.0 | 150.5 | 151.5 | |
| Flash point, ° F | | 365 | 375 | | 380 | 365 | 370 | 370 | | 370 | 365 | 370 | 375 | |
| ASTM pour point, ° F | | −40 | −40 | | −35 | −35 | −45 | −35 | | −35 | −40 | −40 | −40 | |
| Squawk test: | | | | | | | | | | | | | | |
| Condition of parts | Used | Used | Used | Used | New | New | Used | Used | Used | Used | New | Used | Used | Used |
| Squawk at low temp | Tr. | No | No | No | No | Yes | Yes | Yes | Yes | Yes | Tr. | No | No | No |
| Squawk at high temp | Tr. | No | No | No | No | Yes | Yes | Yes | | | Tr. | No | Yes | No |
| 36-hour Chevrolet Engine test: | | | | | | | | | | | | | | |
| (Varnish demerit) | | 1.5 | 1.10 | 0.19 | 0.27 | 0.21 | | | | | | | | |
| Copper-lead bearing weight loss, grams | | 0.15 | 0.25 | 0.066 | 0.045 | 0.078 | | | | | | | | |

[a] In samples 1, 2, 3, 4, 5 and 19, the special polybutene of narrow molecular weight range was used. Otherwise a standard polybutene viscosity index improver was employed.
[b] In samples 6 and 21 sulfur content of the sulfurized sperm oil was 10% by weight. In samples 9 to 18 and 20 it was 6%. In all other cases it was 12%.
[c] This detergent was a 62% oil solution of a combination of barium salt of alkylated phenol sulfide and calcium sulfonate of high molecular weight, except in samples 1, 14, 15 and 16 where the phenol sulfide was further treated with P₂S₅.
[d] Ditertiary butyl cresol.
[e] Copolymer of vinyl acetate and maleic acid ester of "Lorol B" (long chain fatty alcohols derived from coconut oil) as a 20% oil solution.
[f] In samples 11, 12, 13, 15, 16, 17 and 18 the "other" agent was a commercial sulfurized terpene corrosion inhibitor. In samples 20, 21 and 22, it was isopropyl oleate. In samples 23 and 24 it was commercial stearic acid sold under the name Hydrofol 405.
[g] Mixed acid treated Mid-Continent and solvent extracted Coastal.
[h] Unsulfurized sperm oil.

In all the above samples, a very small amount of silicon-containing polymeric foam suppressor was included. It is important to prevent the formation of any substantial quantities of foam in transmission fluids and hydraulic fluids for obvious reasons.

It will be noted from the above table that the use of the fatty acids of the invention to supplement the fatty oil, which is also an essential ingredient, makes the difference between a satisfactory and an unsatisfactory fluid inhibitors per se are not adequate to prevent squawking.

The use of an effective detergent appears to be very important to prevent sludging and varnish formation, especially under long continued, high temperature or other heavy duty operation. Proportions of 0.5 to 4.0% are useful, preferred proportions being about 1 to 3%, based on the total weight of the composition. These are proportions of the active ingredient. When the normal concentrates in oil are employed, this should be taken into account.

It will be understood that variations may be made in composition and that certain of the special properties may not be required for some specialized uses. In such cases, some of the additives may be adjusted in quantity or eliminated altogether.

What is claimed is:

A hydraulic transmission fluid having a viscosity in the range of 34 to 60 SSU at 210° F., a viscosity index above 130, a flash point above 300° F., and a pour point below −20° F., and comprising 75–85 wt. percent of a mineral lubricating oil, 7–15 wt. percent of a shear stable polymeric viscosity index improver selected from the group consisting of polybutene and polymethacrylates, 0.2–1 wt. percent of a vinyl acetate copolymer pour point depressor, up to 0.4 wt. percent of an alkylated phenol oxidation inhibitor, 0.1–0.5 wt. percent of a sulfurized olefinic hydrocarbon corrosion inhibitor, 0.5–4.0 wt. percent of a detergent inhibitor selected from the group consisting of metal salts of alkylated phenol sulfides and petroleum sulfonates, 1–5 wt. percent of sulfurized sperm oil, and 0.1–1 wt. percent of a fatty acid having from 14 to 22 carbon atoms, said sperm oil and fatty acid totaling 1.5–6 wt. percent of said fluid.

References Cited in the file of this patent

UNITED STATES PATENTS

| | | |
|---|---|---|
| 1,319,129 | Wells et al. | Oct. 21, 1919 |
| 2,323,360 | Wallace | July 6, 1943 |
| 2,409,687 | Rogers et al. | Oct. 22, 1946 |
| 2,504,552 | Lewis | Apr. 18, 1950 |
| 2,537,297 | Alexander | Jan. 9, 1952 |
| 2,683,120 | Jennings et al. | July 6, 1954 |
| 2,710,842 | Heisig et al. | June 14, 1955 |
| 2,731,418 | Howell et al. | Jan. 17, 1956 |

OTHER REFERENCES

Lubrication Eng., October 1949, page 231–235.